March 23, 1954

L. O. HAMBERG 2,673,248

MAGNETIC RECORDING AND REPRODUCING APPLICATOR

Filed Dec. 3, 1951

INVENTOR
Lennart Oliver Hamberg

BY
Pierce, Scheffler & Parker,
ATTORNEYS.

Patented Mar. 23, 1954

2,673,248

UNITED STATES PATENT OFFICE 2,673,248

MAGNETIC RECORDING AND REPRODUCING APPLICATOR

Lennart Oliver Hamberg, Bromma, Sweden

Application December 3, 1951, Serial No. 259,515

Claims priority, application Sweden December 6, 1950

7 Claims. (Cl. 179—100.2)

Figures 1, 2, 3, 4, 5:
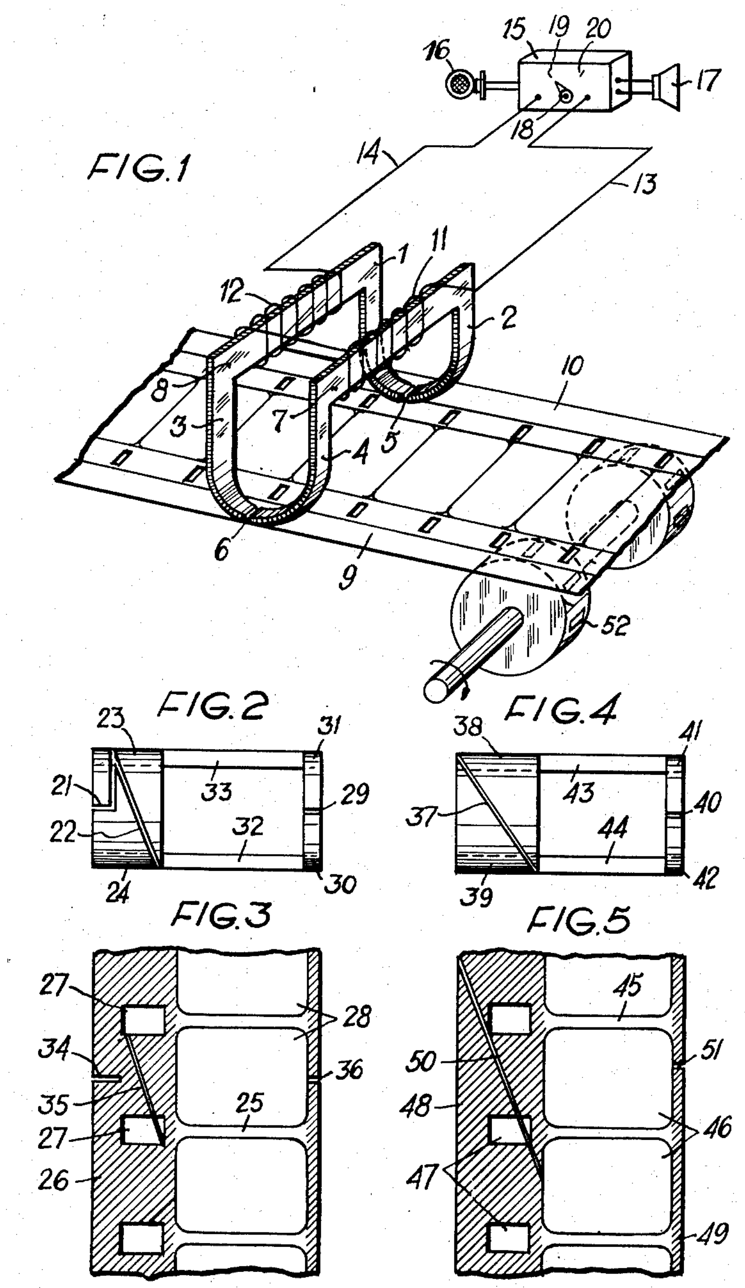

The present invention refers to magnetic applicators for recording and reproducing of sound on a magnetic carrier, said applicators being provided with more than one non-magnetic gap. Previously known applicators of this type consist of an iron core of a closed annular or elongated shape and provided with two diametrical non-magnetic gaps, two series-connected coils surrounding the core, one on each side of the gaps. One of the gaps is used for magnetic recording and reproducing, a magnetic tape coated with magnetic material being moved transversely over the gap. The other gap has for its function to reduce disturbances from external sources, which disturbances might produce humming sounds, for example. This secondary gap has the drawback, however, that the output voltage from the applicator is reduced on account of the increased reluctance of the magnetic circuit, as the secondary gap is only used to eliminate disturbances. Another known applicator with two oppositely located non-magnetic gaps is arranged to service separate ones of the sound tracks of a dual track record.

The invention has for its object to obviate the drawbacks in plural-gap applicators as hitherto known and to produce an applicator with an increased output and great freedom from disturbances, which is brought about by the fact that the gaps are located in the same plane while being series-connected in a magnetic circuit and adapted at the same time to be bridged by spaced parallel tracks of magnetic material on a common carrier adjacent to the gaps. Through this cooperation the magnetic flux in the gaps will be utilized more effectively, while the output is also increased, which involves that simpler apparatus may be used for the reproduction, which also becomes more free from disturbances.

For the utilization of two separate parallel simultaneously recorded sound tracks it is conceivable to make use of two separate series- or parallel-connected applicators. Then, however, it could hardly be avoided that four coils were brought into use, and since it is endeavoured in practice to make the coils of the magnetic applicators as few and as small as possible to reduce the number of flux lines from external sources of disturbances, such as commutator motors and power transformers, such a combination of magnetic applicators is hardly believed to be practicable.

An example of embodiment of a magnetic applicator according to the invention will be described hereinbelow with reference to the accompanying drawing, in which Fig. 1 is a diagrammatic perspective view illustrating the construction of such an applicator when used together with a 16 mm. motion picture coated with magnetic material. Fig. 2 shows a magnetic applicator viewed from below and intended for a 8 mm. film. Fig. 3 shows a fragment of an 8 mm. film with the location of the gaps relatively to the film in an applicator according to Fig. 2. Fig. 4 shows a further construction, viewed from below, of an applicator for 8 mm. films and Fig. 5 shows a fragment of an 8 mm. film with the location of the gaps relatively to the film in the applicator according to Fig. 4.

The applicator shown in Fig. 1 has an iron core consisting of two pairs of pole portions 1, 2 and 3, 4, respectively, which are curved in the same direction and bent to U-shape and provided with non-magnetic gaps 5 and 6 respectively midway of the curved portions. Said curved pole portions are intended to constitute contacting surfaces for separate magnetic sound tracks on a flexible tape or film. The straight portions of the pole portions are at the ends thereof connected in pairs by means of yokes 7 and 8, respectively. The lengths of the yokes are adapted so that each of the gaps 5 and 6 will be located right opposite sound tracks 9 and 10 respectively of a film, which is moved in its longitudinal direction along the gaps of the pole shoes. The gaps will thus lie in the same plane and are positioned at right angles to the longitudinal direction of the film. Provided about each one of the two yokes 7 and 8 is coils 11 and 12 respectively, which are preferably series-connected, and the free ends 13 and 14 respectively of which are connected to an amplifier 15 in such manner that the latter will, in recording sounds, create amplified sound impulses from a microphone 16 and transmit such impulses through the coils, or will, in reproducing, amplify the current to a loudspeaker 17. The amplifier may preferably be shifted by means of a switch 18 to perform the above-mentioned functions, said switch being adjustable into two positions 19, 20, the position 19 of which corresponds, for instance, to recording and the position 20 to reproduction. The above is valid, if the same applicator is used both for recording and reproducing. Separate applicators may also be used both for recording and reproducing, and separate amplifiers and apparatus may be used for the recording and reproducing of the sound. The magnetic applicator according to the invention may also be arranged to erase recorded sounds, for instance by means of high frequency current.

The magnetic applicator according to the invention, in addition to comprising the features of the example illustrated in Fig. 1 with gaps extending transversely relatively to the film, for instance in a dual-perforated 16 mm. film with double sound tracks, may also be constructed with obliquely extending gaps, as shown in Figs. 2 and 4. This will be found particularly serviceable in connection with 8 mm. films, wherein the gap is positioned obliquely within the range comprising the perforation. The oblique positioning should then, in order that the perforation shall not have a detrimental effect, be so devised that the effective width of the sound track is always constant. According to Fig. 2, the gaps 21 and 22 are formed on one side of the applicator by the pole portions 23 and 24, the gap 21 then extending transversely to the film 25 (Fig. 3) over that portion of the sound track 26 which is located outside the perforation 27, while the oblique gap 22 is located over that portion of the sound track 26 where the perforation 27 is located. On the other side of the row of pictures 28 of the film 25 the straight gap 29 will be found, which is formed by the pole portions 30 and 31 of the applicator. The pole shoes 24 and 30 are connected by the yoke 32, and the pole shoes 23 and 31 are connected by the yoke 33. Coils, not shown, are arranged on the yokes. How the gaps are located relatively to the film 25 will be seen from Fig. 3, where the gaps 21 and 22 of the applicator correspond to 34 and 35 respectively, while the straight gap 29 on the other side of the applicator corresponds to 36 in Fig. 3.

Fig. 4 shows an applicator for an 8 mm. film viewed from below, said applicator having an oblique gap 37 arranged over the whole width of the pole portions. On the other side, the straight gap 40 is then formed by the pole portions 41 and 42. The pole portions 38 and 41 are connected by the yoke 43, while the pole portions 39 and 42 are connected by the yoke 44. Coils, not shown, are arranged on the yokes. Fig. 5 shows the location of the gaps in the applicator according to Fig. 4 in relation to an 8 mm. film 45 with a row of pictures 46, perforations 47, and a sound track 48 over the whole of that space outside the perforation which is located on the perforation edge, and a sound track 49 on the other edge of the film 45. The oblique gap 37 is then represented by 50, while the straight gap 40 is represented by 51.

In recording of sounds on a film coated with magnetic tracks by means of the magnetic applicator according to the invention, the sound impulses are supplied from the microphone 16 over the amplifier 15 switched into the position 19 by means of the switch 18, from the output stage of said amplifier to the magnetic applicator through the conductors 13 and 14 to the coils 11 and 12. The currents through these coils will thus magnetize the iron core of the magnetic applicator, and magnetic lines of force will be created in the gaps 5 and 6. The film which is covered with magnetic tracks 9 and 10 is moved at a constant rate across the gaps 5 and 6 by means of any suitable contrivance, diagrammatically shown in Fig. 1 at 52 and consisting, for instance, of a driving means provided with equalizing means, said driving means being operated from the same motor that feeds the film intermittently for the reproduction of pictures, if pictures and sound are to be recorded at the same time in the camera. The magnetic lines of force in the gaps 5 and 6 will then energize the tracks 9 and 10, so that a remanent magnetism remains on the tracks, the strength of which magnetism varies in agreement with the variations of the recorded sound.

In reproducing the recorded sound the film is moved, for instance, through a projector provided with a magnetic applicator according to the invention, and is fed continuously in the same manner as in recording past the gaps 5 and 6. The magnetism of the sound tracks then induces voltages in the coils 11 and 12, which are conveyed further through the wires 13 and 14 to the amplifier, the switch 18 of which takes the position 20, so that the incoming voltage is amplified and taken out from the last stage to a loudspeaker 17 for the reproduction of the recorded sound.

The magnetic applicator described above and disclosed in the drawing only constitutes an example of embodiment according to the invention, which may be varied with respect to its construction and details, without the inventive idea being departed from. Thus the magnetic applicator may be made with the iron core in a plane, the iron core being positioned obliquely relatively to the longitudinal direction of the film, and two gaps being arranged in positions touching the sound tracks and displaced relatively to each other in the longitudinal direction of the film. Here, the sound will be located in displaced relation on the various sound tracks, but this is of no consequence, if the same applicator and the same dimensions of the applicator are used in recording and reproducing.

A magnetic applicator according to the invention may comprise a magnetic structure having only one pole portion with a magnetic gap in said pole portion, said gap being positioned obliquely to the longitudinal direction of a flexible tape being moved across said gap. The gap in such an applicator with only one gap may also be composed of gaps positioned both at right angles and obliquely relatively to the longitudinal direction of a flexible tape moved across the gap.

What I claim is:

1. A magnetic applicator comprising a magnetic structure having a pair of yokes, the ends of said yokes being connected by pairs of convex pole portions having a non-magnetic gap therein, said convex pole portions being curved in the same direction and constituting contacting surfaces for separate magnetic sound-tracks on a flexible tape.

2. A magnetic applicator comprising a magnetic structure having a pole portion, a non-magnetic gap in said pole portion, contacting surfaces at said gap situated in a plane for moving a flexible tape across said gap, and said gap being composed of gaps positioned both at right angles and obliquely relatively to the longitudinal direction of the tape.

3. A magnetic applicator comprising a magnetic structure having two pole portions, each of said pole portions having a non-magnetic gap therein, said gaps being composed of gaps positioned both at right angles and obliquely relatively to the longitudinal direction of a flexible tape being moved across said gap.

4. A magnetic applicator comprising a magnetic structure having two pole portions, each of said pole portions having a non-magnetic gap therein, one of said gaps extending at right angles to the longitudinal direction of a flexible tape and the other gap being positioned obliquely to the longitudinal direction of said tape being moved across said gaps.

5. A magnetic applicator comprising a magnetic structure having two pole portions, each of said pole portions having a non-magnetic gap therein, one of said gaps extending at right angles to the longitudinal direction of a flexible tape being moved across said gaps and the other gap being composed of gaps positioned both at right angles and obliquely relatively to the longitudinal direction of said tape.

6. A magnetic applicator according to claim 1, in which said non-magnetic gaps are positioned at right angles to the longitudinal direction of the tape.

7. A magnetic applicator according to claim 1, in which said non-magnetic gaps are positioned obliquely to the longitudinal direction of the tape.

LENNART OLIVER HAMBERG.

References Cited in the file of this patent

UNITED STATES PATENTS

| Number | Name | Date |
|---|---|---|
| 2,517,808 | Sziklai | Aug. 8, 1950 |
| 2,543,483 | Barrett | Feb. 27, 1951 |
| 2,581,209 | Shepard | Jan. 1, 1952 |